United States Patent [19]

Bagley

[11] Patent Number: 5,418,577
[45] Date of Patent: May 23, 1995

[54] SYSTEM FOR RECEIVING THE AUDIO PORTION OF A TV SIGNAL AT A REMOTE LOCATION

[76] Inventor: Alan W. Bagley, 6300 Fryden Hoj, Box 263, Saint Thomas, V.I. 00802

[21] Appl. No.: 104,531

[22] Filed: Aug. 11, 1993

[51] Int. Cl.⁶ .............................................. H04N 5/46
[52] U.S. Cl. ...................................... 348/729; 455/6.1
[58] Field of Search ................. 348/729, 738, 10, 6, 348/723, 725; 358/198, 189; 455/6.1, 11.1, 7; H04N 5/46

[56] References Cited

U.S. PATENT DOCUMENTS

| 4,021,737 | 5/1977 | Trask | 455/41 |
| 5,016,272 | 5/1991 | Stubbs et al. | 348/10 |
| 5,243,415 | 9/1993 | Vance | 455/6.1 |
| 5,293,633 | 3/1994 | Robbins | 455/6.1 |

FOREIGN PATENT DOCUMENTS

| 0102069 | 6/1985 | Japan | 358/198 |
| 0241383 | 11/1985 | Japan | 358/198 |

*Primary Examiner*—James J. Groody
*Assistant Examiner*—Jeffrey S. Murrell

[57] ABSTRACT

A new and improved remote audio monitoring system is disclosed comprising an FM transmitter, and one or more remote cordless FM receiving terminals. The transmitter is coupled to the audio output channel of a cable or satellite television descrambler box so as to rebroadcast the audio signal to the remote FM receiving terminals. As a result, the T.V. sound track may be listened to at selected remote locations without the need for hard wired connections.

2 Claims, 3 Drawing Sheets

3
SYSTEM FOR RECEIVING THE AUDIO PORTION OF A TV SIGNAL AT A REMOTE LOCATION

BACKGROUND OF THE INVENTION

1. Field of the Invention

The present invention relates generally to radio broadcasting systems, and, more particularly, to a radio broadcasting system capable of transmitting the audio channel from a received T.V. signal to one or more selected remote locations.

2. Description of the Prior Art

It is generally well known to relay an audio signal from one location to another utilizing hard wired connections. For example, a remote speaker positioned in the backyard of a residence may be connected by suitable electrical wiring to an FM or AM radio, or a stereo audio system in the living room of the house thereby permitting an individual working or lounging in the backyard to hear and enjoy the audio program being played. Similarly, when it is desired to hear the audio channel of a transmitted T.V. at a remote location, either a portable T.V. set or a similar hard wired connection is required. The need for stringing wires over relatively long distances is inconvenient, may cause a safety hazard, and can lead to a deterioration of the transmitted signal quality especially if the wire runs are lengthy. A need definitely exists therefore for a method and means for re-transmitting an audio signal from one location to one or more remote locations without using hard wire connections therebetween. The foregoing desideratum is achieved by the unique remote audio monitoring system of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved remote audio monitoring system comprising an FM transmitter, and one or more remote cordless FM receiving terminals. The transmitter is coupled to the audio output channel of a cable or satellite television descrambler box so as to rebroadcast the audio signal to the remote FM receiving terminals. As a result, the T.V. sound track may be listened to at selected remote locations without the need for hard wired connections.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining the preferred embodiment of the invention in detail as required by statute, it will be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved remote audio monitoring system which has all of the advantages of the prior art and none of the disadvantages.

It is another object of the present invention to provide a new and improved remote audio monitoring system which may be easily and efficiently manufactured and marketed.

It is a further object of the present invention to provide a new and improved remote audio monitoring system which is of durable and reliable construction.

An even further object of the present invention is to provide a new and improved remote audio monitoring system which is susceptible of a low cost of manufacture with regard to both materials and labor, and which accordingly is then susceptible of low prices of sale to the consuming public, thereby making such remote audio monitoring system readily available to the buying public.

Still yet a further object of the present invention is to provide a new and improved remote audio monitoring system which provides access to the T.V. audio channel at remote locations without need for hard wired connections.

Still another object of the present invention is to provide a new and improved remote audio monitoring system adapted to be connected to the descrambler box of a cable or satellite T.V. system so that the audio channel of the received and/or unscrambled T.V. signal may be rebroadcast to one or more remote locations.

Yet another object of the present invention is to provide a new and improved remote audio monitoring system which is very simple in construction and operation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, the new and improved remote audio monitoring system embodying the principles and concepts of the present invention now will be described in greater detail.

Figure 1:
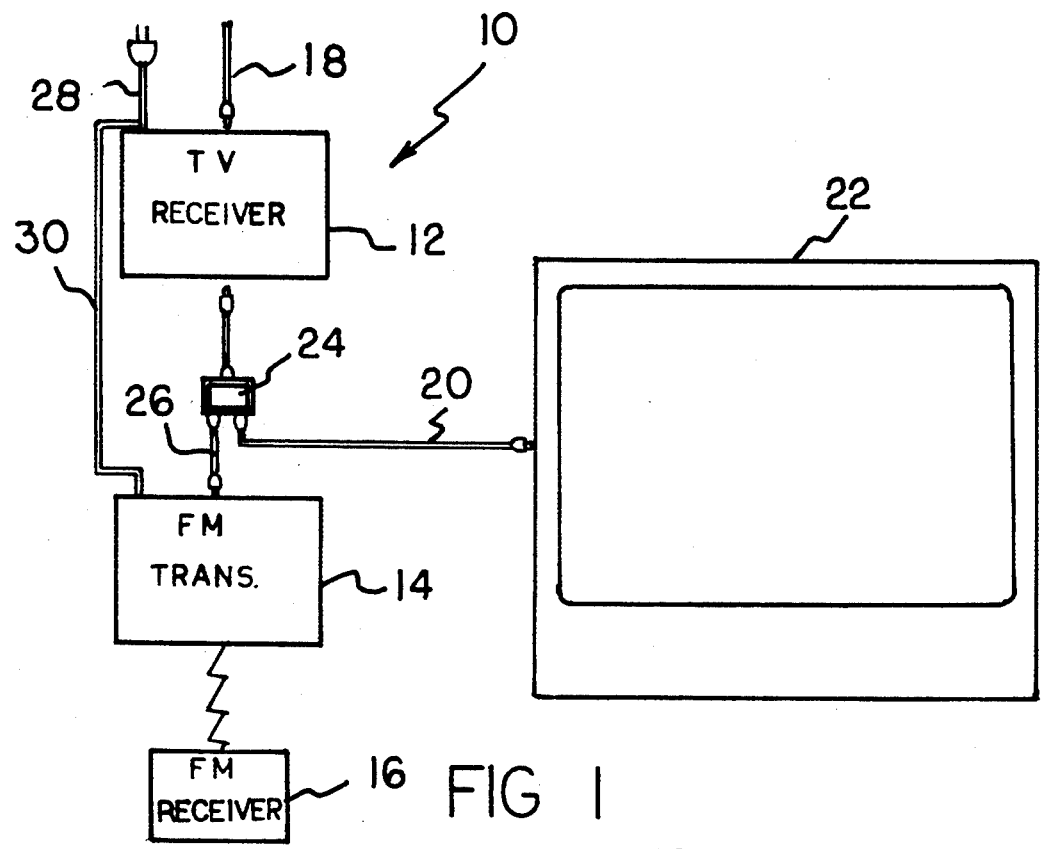
FIG. 1 is a schematic block diagram of the preferred embodiment of the remote audio monitoring system of the present invention.
Figure 2:
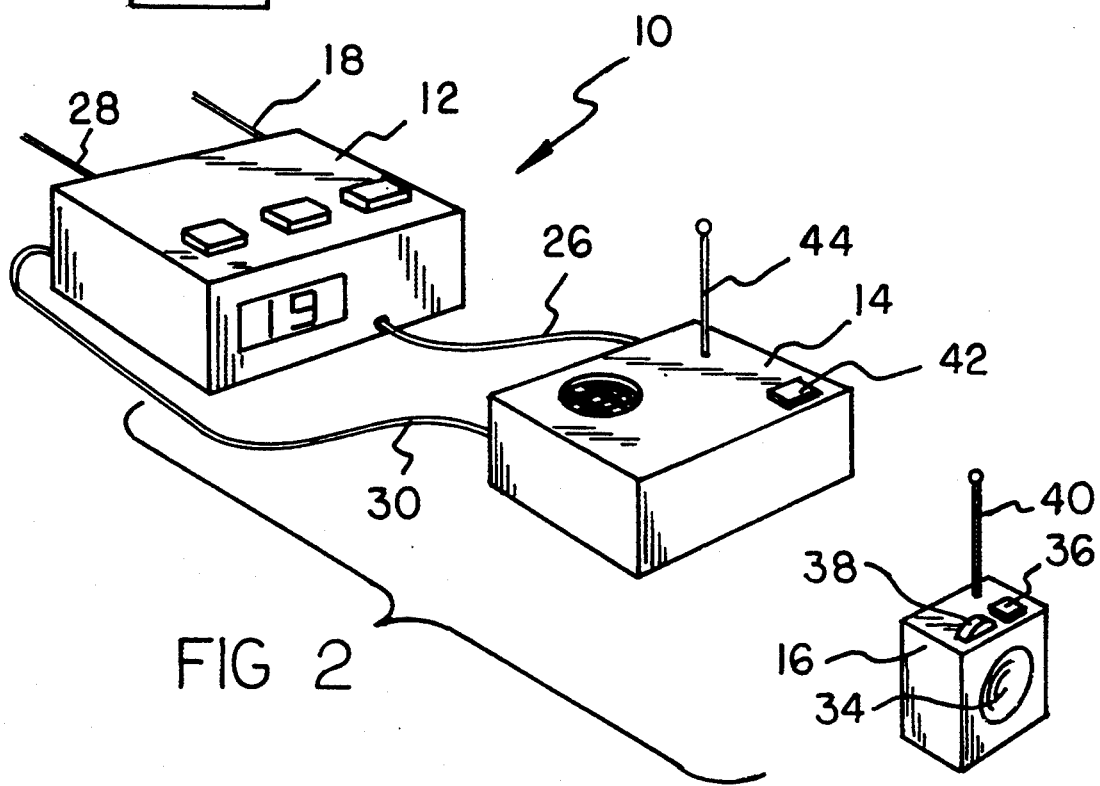
FIG. 2 is a perspective view of the components of the remote audio monitoring system of FIG. 1. the vehicle.

Turning initially to FIGS. 1 and 2, there is shown an exemplary embodiment of the remote audio monitoring system of the invention generally designated by reference numeral 10. In its preferred form, remote audio monitoring system 10 includes a T. V. receiving unit 12 for detecting and demodulating a conventionally broadcast T.V. signal, an FM radio transmitter unit 14, and one or more FM receiver units 16 each capable of being physically located at a remote site distanced from transmitter unit 14.

In a typical arrangement, T.V. receiver unit 12 may comprise a conventional cable T.V. converter box such as, for example, the Model 8600 marketed by Scientific Atlanta, which, in turn, is suitably connected to a cable T.V. input lead 18 for ultimately producing a T.V. output signal on an appropriate signal line 20 connected to conventional T.V. set 22. The output of receiver unit 12 also is connected through branch connection 24 and cable 26 to FM transmitter 14 as will be explained in further detail below. To complete the hook-up, a power cord 28 supplies electrical power to receiver 12 and through use of a duplex also to FM transmitter along power cord 30.

In accordance with the invention, there is no hard wire connection between FM transmitter 14 and FM receiver 16. Instead, FM transmitter 14 re-broadcasts the audio or FM signal portion of the tuned T.V. signal received via receiver 12 and each receiver 16 then converts the re-broadcast signal into a listenable audio signal reproduced through a suitable amplifier and speaker located in each receiver unit 16. In this regard, each receiver unit 16 has a speaker grill 34, a power on-off switch 36, a volume control 38, and an extensible rod antenna 40. Similarly, transmitter unit 14 has an on-off switch 42 and an extensible rod antenna 44. The details of the FM transmitter 14 and the individual FM receiver units 16 are well known and understood. Suitable components may comprise the FM CORDLESS ROOM MONITOR, Cat. No. 43-202, distributed by Radio Shack, Forth Worth, Tex., which includes such FM transmitting and receiving units. Suffice it to say, that in this system, the transmitter unit is adapted to rebroadcast an audio input applied via a microphone to a "cordless" remote receiver unit using low-power FM transmission and reception over one or more selected carrier frequencies.

Figure 3:
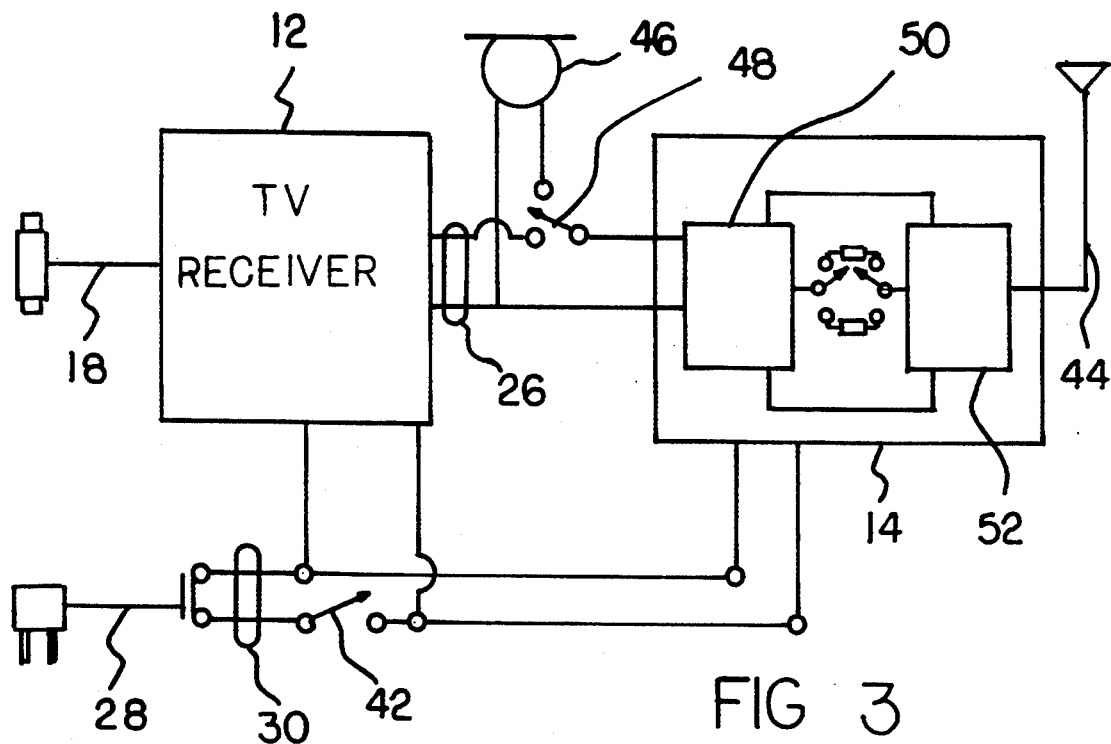
FIG. 3 is an electrical schematic circuit diagram of the transmitter portion of the remote audio monitoring system of the invention shown in FIGS. 1 and 2.

In carrying out the invention, the output signal made available on line 26 and which includes the audio channel information of the tuned T.V. signal from receiver 12, must suitably be connected to the input of FM transmitter 14. This may be accomplished by connecting the output cable 26 directly to the microphone input line of the FM transmitter unit 14 of the aforementioned CORDLESS ROOM MONITOR system through a conventional mini-plug microphone jack. This is shown in more detail in FIG. 3 and 4, where reference numeral 46 represents the condenser microphone of the FM transmitter unit 14, and reference numeral 48 represents a switch which enables the unit to also be used as an intercom. Also shown in FIG. 3, is the on-off switch 42, the FM transmitter unit's amplifier and transmitter sections 50 and 52, respectively, and antenna 44.

Figure 4:
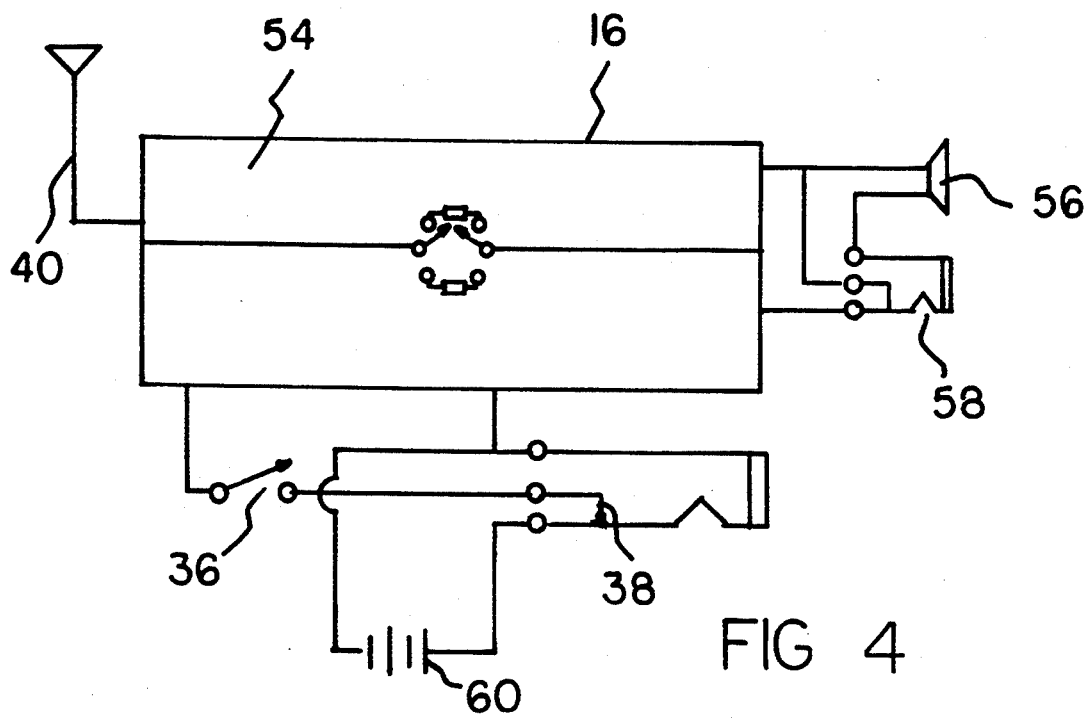
FIG. 4 is an electrical schematic circuit diagram of a remote receiver terminal employed with the remote audio monitoring system of the invention shown in FIGS. 1 and 2.

Each "cordless" FM receiver unit 16 as shown in FIG. 4, includes an FM receiver 54 with an amplifier (not shown), audio speaker 56, earphone output jack 58, the on-off switch 36, with volume control, a battery 60 (e.g. 9 volt) and connection for external 9 V power source for powering the unit, and antenna 40.

Figure 5:
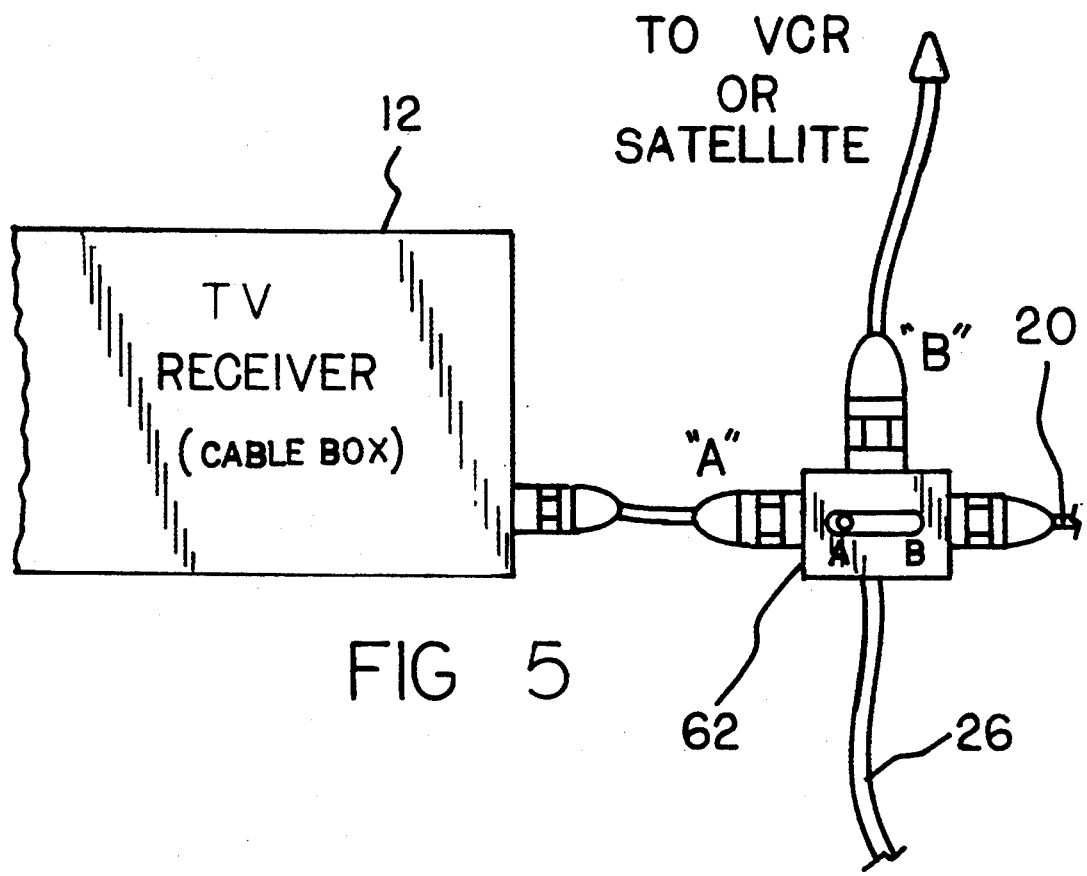
FIG. 5 is a schematic diagram of a preferred signal connection means used in the remote audio monitoring system of FIGS. 1 and 2.

In operation, the FM transmitter unit will re-broadcast the audio channel from the received, tuned T.V. signal made available on line 26 thereby permitting anyone listening at a remote location to the "cordless" receiver unit 16 to hear the audio portion of the tuned T.V. signal. It will be appreciated that the rebroadcast radio signal may be obtained from sources other than the cable T.V. converter box 12. For example, as shown in FIG. 5, a conventional A-B switch 62 may be connected between the output of the cable box 12 and a conventional VCR or satellite T.V. receiver thus enabling the user to selectively choose from among several sources for the audio channel of a broadcast T.V. signal to be re-broadcast as will be apparent to those of ordinary skill in the art.

Figure 6:
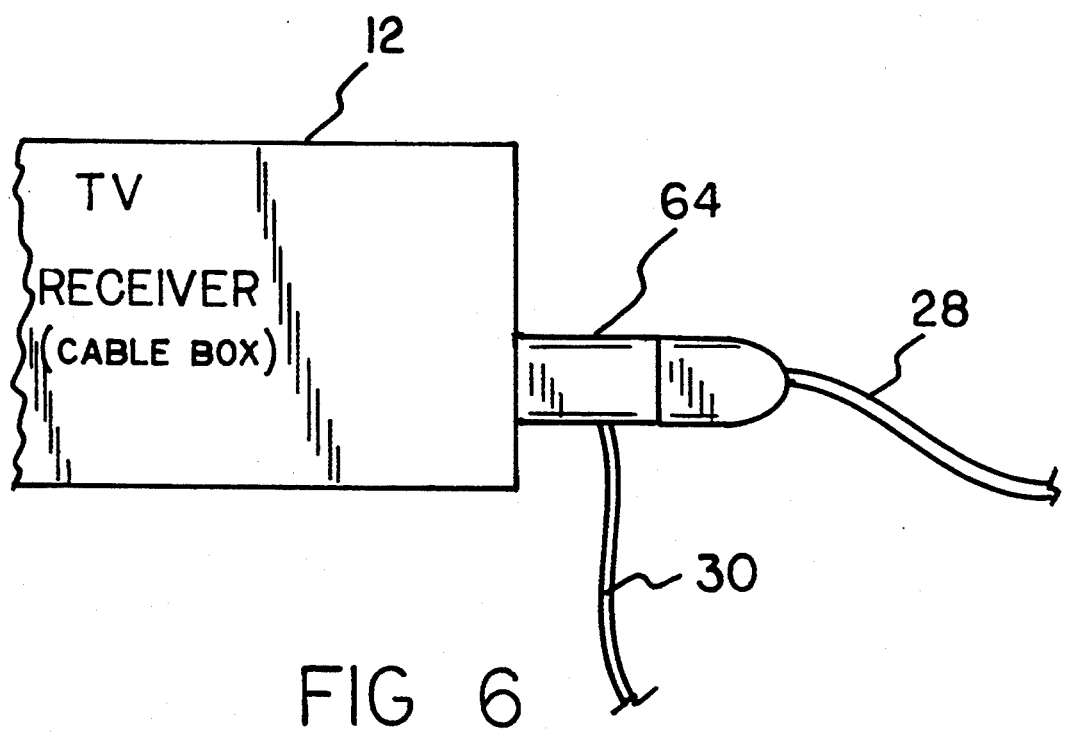
FIG. 6 is a schematic diagram of a preferred electrical power connection means used in the remote audio monitoring system of FIGS. 1 and 2.

Finally, FIG. 6 shows a duplex power cord adaptor 64 plugged into the A.C. receptacle of cable converter box 12 so that the power cords 28 and 30 may suitably be connected in a preferred manner.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved remote audio monitoring system, comprising:

means for receiving a T.V. signal having a video channel and an audio channel at a first location, a separate FM transmitter, said FM transmitter being coupled to said T.V. signal receiving means for receiving only said audio channel at a first location and being responsive thereto for retransmitting said audio channel, and at least one remote cordless FM receiving terminal adapted to receive said retransmitted audio signal transmitted by said FM transmitter, wherein said remote cordless FM receiving terminal includes means associated therewith for aurally reproducing said audio channel, said remote cordless FM receiving terminal being located at a second remote location with respect to said first location, wherein said aural reproducing means comprises amplifier and audio speaker means connected to said FM receiving means, wherein said means for receiving a T.V. signal comprises a cable T.V. converter, said cable T.V. converter and said separate FM transmitter being located at said first location, further comprising switch means connected between said cable T.V. converter and said FM transmitter, said switch means having a pair of selectively switchable inputs, one of said inputs being connected to said cable T.V. converter in one selected position of said switch means and the other of said inputs being connected to an external T.V. signal source in a second selected position of said switch means.

2. The system of claim 1 wherein said external T.V. signal source is selected from the group consisting of a VCR or a satellite T.V. receiver.

* * * * *